United States Patent
Morita et al.

(10) Patent No.: US 6,476,123 B1
(45) Date of Patent: *Nov. 5, 2002

(54) CROSSLINKED ORGANIC PARTICLES, SUSPENSIONS, AND METHODS FOR PREPARING CROSSLINKED ORGANIC PARTICLES AND SUSPENSIONS

(75) Inventors: Yoshitsugu Morita; Kazuo Kobayashi; Ryuji Tachibana, all of Chiba Prefecture (JP)

(73) Assignee: Dow Corning Toray Silicone Co., Ltd., Tokyo (JP)

( * ) Notice: Subject to any disclaimer, the term of this patent is extended or adjusted under 35 U.S.C. 154(b) by 121 days.

This patent is subject to a terminal disclaimer.

(21) Appl. No.: 09/626,053

(22) Filed: Jul. 26, 2000

(30) Foreign Application Priority Data

Aug. 3, 1999 (JP) .............................. 11-220001

(51) Int. Cl.$^7$ ............................... C08J 3/16; C08J 3/05
(52) U.S. Cl. ................... 524/837; 525/100; 525/478; 528/15; 528/25
(58) Field of Search ................ 525/100, 106, 525/478, 479; 523/223, 346; 524/837, 862; 528/14, 15, 31, 25

(56) References Cited

U.S. PATENT DOCUMENTS

| 4,761,454 | A | * | 8/1988 | Oba et al. ................. 525/478 |
| 5,891,966 | A | * | 4/1999 | Murry et al. ................ 525/100 |
| 5,908,951 | A | * | 6/1999 | Kobayashi et al. ......... 556/479 |
| 5,928,660 | A | * | 7/1999 | Kobayashi et al. ......... 424/401 |
| 5,969,035 | A | * | 10/1999 | Meinhardt et al. .......... 524/731 |
| 5,969,039 | A | * | 10/1999 | Kobayashi et al. ......... 524/837 |

FOREIGN PATENT DOCUMENTS

CA   2236056   * 10/1998

OTHER PUBLICATIONS

Database WPI on Dialog, week 199711, London: Derwent Publications Ltd., AN–1997–11529, JP 09003408 A (Dow Corning Toray Silicone) abstract.

* cited by examiner

Primary Examiner—Daniel S. Metzmaier
(74) Attorney, Agent, or Firm—Jim L. De Cesare

(57) ABSTRACT

Certain crosslinked organic particles exhibit a very good affinity for organic oils such as mineral oils and synthetic oils. They also exhibit a suitable affinity for silicone oils. Highly efficient methods for preparing crosslinked organic particles are provided. The crosslinked organic particles in the form of a suspension containing the particles have excellent handling properties, and are highly blendable with other components. Highly efficient methods for preparing such suspensions are also provided.

6 Claims, No Drawings

CROSSLINKED ORGANIC PARTICLES, SUSPENSIONS, AND METHODS FOR PREPARING CROSSLINKED ORGANIC PARTICLES AND SUSPENSIONS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention relates to crosslinked organic particles and suspensions thereof, and to methods for preparing crosslinked organic particles and their suspensions. More particularly, the invention relates to crosslinked organic particles that exhibit a very good affinity for organic oils such as mineral oils and synthetic oils, and that also exhibit suitable affinity for silicone oils. The invention additionally relates to very efficient methods for preparing crosslinked organic particles. Further, the invention relates to crosslinked organic particle suspensions that have excellent handling properties, and which are highly blendable with other components. The invention also relates to very efficient methods for preparing the suspensions.

BACKGROUND OF THE INVENTION

Silicone rubber particles have excellent resistance to heat, cold, and weathering, and have excellent electrical properties. As a consequence, they are useful as impact resistance improvers, flexibilizers, cracking inhibitors, flatting agents, softeners, tactile sensation improvers, oil absorbents, and lubricants for thermoplastic resins, thermosetting resins, paints, coatings, cosmetics, rubbers, and toners and carriers for electrostatic development.

However, while silicone rubber particles have a very good affinity for silicone oils, they suffer from a poor affinity for organic oils such as mineral oils and synthetic oils.

To address such problems, Japanese Laid Open (Kokai or Unexamined) Patent Application Number Hei 9-3408 (3,408/1997) discloses silicone rubber particles that contain $C_5$ to $C_{30}$ alkyl groups bonded to the silicon therein. These silicone rubber particles nevertheless remain a problem because their affinity for organic oils does not reach an acceptable level, yet their affinity for silicone oils is still high.

BRIEF SUMMARY OF THE INVENTION

It is an object of the invention, therefore, to provide crosslinked organic particles that exhibit a very good affinity for organic oils such as mineral oils and synthetic oils, and that also exhibit a suitable affinity for silicone oils.

Another object is to provide highly efficient methods for preparing crosslinked organic particles.

An additional object is to provide crosslinked organic particle suspensions that have excellent handling properties, and which are highly blendable with other components.

Yet another object is to provide highly efficient methods for preparing such suspensions.

These and other features of the invention will become apparent from a consideration of the detailed description.

BRIEF DESCRIPTION OF THE SEVERAL VIEWS OF THE DRAWING

Not applicable.

DETAILED DESCRIPTION OF THE INVENTION

Crosslinked organic particles according to the invention have an average particle size of 0.1 to 500 μm, and are provided by the hydrosilylation-induced crosslinking of a fluid composition comprising (A) an organic compound that has at least 2 aliphatically unsaturated bonds in each molecule, (B) an organopolysiloxane that has at least 1 alkenyl group in each molecule, (C) a silicon-containing organic compound that has at least 2 silicon-bonded hydrogen atoms in each molecule, and (D) a catalyst of the hydrosilylation reaction.

Crosslinked organic particle containing suspensions of the invention contain water, an emulsifying agent, crosslinked organic particles, and wherein the particles are dispersed in water.

One method for preparing crosslinked organic particles is to emulsify a fluid composition comprising (A) an organic compound that has at least 2 aliphatically unsaturated bonds in each molecule, (B) an organopolysiloxane that has at least 1 alkenyl group in each molecule, (C) a silicon-containing organic compound that has at least 2 silicon-bonded hydrogen atoms in each molecule, and (D) a catalyst of the hydrosilylation reaction, in water using an emulsifying agent, crosslinking the fluid composition by carrying out an hydrosilylation reaction, and thereafter removing the water.

Another method for preparing crosslinked organic particles is to emulsify a fluid composition comprising components (A), (B), and (C), in water using an emulsifying agent, thereafter adding component (D), then crosslinking the composition by carrying out hydrosilylation, and finally removing water.

One method for preparing suspensions of crosslinked organic particles according to the invention is by emulsifying a fluid composition comprising (A) an organic compound that has at least 2 aliphatically unsaturated bonds in each molecule, (B) an organopolysiloxane that has at least 1 alkenyl group in each molecule, (C) a silicon-containing organic compound that has at least 2 silicon-bonded hydrogen atoms in each molecule, and (D) a catalyst for the hydrosilylation reaction, in water using an emulsifying agent, and crosslinking the fluid composition by carrying out the hydrosilylation reaction.

Another method for preparing suspensions of crosslinked organic particles is by emulsifying a fluid composition comprising components (A), (B), and (C), in water using an emulsifying agent, thereafter adding component (D), and then crosslinking the composition by carrying out hydrosilylation.

Crosslinked organic particles of the invention are crosslinked organic particles provided as a result of an hydrosilylation-induced crosslinking of the fluid composition of components (A) through (D) described above. These particles should have an average particle size in the range from 0.1 to 500 μm, and preferably they have an average particle size in the range from 0.1 to 200 μm. It is quite difficult to prepare crosslinked organic particles with an average particle size below the lower limit of the given range. Crosslinked organic particles with an average particle size exceeding the upper limit of the given range exhibit an increasingly impaired dispersibility, when blended into organic resins, paints, coatings, and cosmetics. The shape of the crosslinked organic particles can be spherical, spindle-shaped, plate-like, disk-like, or irregular, with a spherical shape being preferred. The crosslinked organic particles can be elastomeric in form such as a soft gel or rubber, or they can be a hard resin. Elastomers such as gels and rubbers are preferred, and rubbers are particularly preferred.

Organic compound (A) contains at least 2 aliphatically unsaturated bonds in each molecule. The aliphatically unsaturated group in (A) can be a group present in a molecular chain terminal position or in a pendant position on the molecular chain. It can be an alkenyl group such as vinyl, allyl, butenyl, and pentenyl; an alkynyl group such as ethynyl; or a cyclic unsaturated group such as the norbornene group or dicyclopentadienyl. The aliphatically unsaturated group can also be within the molecular chain, in which case, it would constitute an enylene group such as vinylene or propenylene. Groups present in the terminal or pendant position on the molecular chain such as vinyl and allyl are preferred, however.

Component (A) can be a solid or liquid, but liquids are preferred. When component (A) is a solid, it is necessary to preliminarily dissolve it in component (B) or (C), or component (A) can be dissolved in an organic solvent. While the molecular weight of component (A) is not critical, its average molecular weight is preferably in the range from 50 to 50,000.

Component (A) can be exemplified by dienes such as pentadiene, hexadiene, heptadiene, octadiene, nonadiene, cyclopentadiene, and cyclooctadiene; aromatic dienes such as divinylbenzene; ethers such as diallyl ether, triethylene glycol divinyl ether, cyclohexane dimethanol divinyl ether, and 1,2-divinylglycol; diene esters such as diallyl isophthalate, diallyl phthalate, diallyl terephthalate, diallyl maleate, and triallyl trimellitate; oligomers from polymerization of any of the former; olefin oligomers containing at least 2 aliphatically unsaturated bond-containing groups in each molecule which are produced by polymerization of an olefin such as ethylene, propylene, butene, isobutene, pentene, or hexene; oligomers from polymerization of an alkenyl-functional acrylic monomer such as allyl (meth) acrylate, butenyl (meth)acrylate, methylbutenyl (meth) acrylate, methylpropenyl (meth)acrylate, heptenyl (meth) acrylate, and hexenyl (meth)acrylate; oligomers from copolymerization of acrylic monomer listed above with a monomer such as methyl (meth)acrylate, ethyl (meth) acrylate, butyl (meth)acrylate, ethylhexyl (meth)acrylate, lauryl (meth)acrylate, styrene, α-methylstyrene, maleic acid, vinyl acetate, or allyl acetate; oligomers from the reaction of an alkenyl isocyanate such as allyl isocyanate, (meth)acryloyl isocyanate, or 2-isocyanatoethyl (meth) acrylate), or an alkenyl-functional carboxylic acid anhydride such as itaconic anhydride, maleic anhydride, or tetrahydrophthalic anhydride, with an oligomer produced by copolymerization of monomers referenced above and a hydroxyl-functional acrylic monomer such as 2-hydroxyethyl (meth) acrylate, 2-hydroxypropyl (meth)acrylate, or 4-hydroxybutyl (meth)acrylate; oligomers from the reaction of an alkenyl alcohol such as allyl alcohol, butenol, 2-(allyloxy)ethanol, glycerol diallyl ether, cyclohexene methanol, methylbutenol, and oleyl alcohol, with an oligomer produced by polymerization of an isocyanate-functional acrylic monomer such as (meth)acryloyl isocyanate and 2-isocyanatoethyl (meth)acrylate) or with oligomers produced by copolymerization of such isocyanate-functional acrylic monomers with monomers referenced above; oligomers from reaction of an alkenyl-functional epoxy compound such as glycidyl (meth)acrylate and allyl glycidyl ether with an oligomer produced by polymerization of a carboxyl-functional monomer such as (meth)acrylic acid, itaconic acid, and maleic acid, or with an oligomer produced by copolymerization of such carboxyl-functional monomers with monomers referenced above; polyethers obtained by ring-opening polymerization of allyl glycidyl ether using ethylene glycol as the initiator; polyethers obtained by the ring-opening polymerization of vinylcyclohexane-1,2-epoxide using butanol, allyl alcohol, or propargyl alcohol as the initiator; alkenyl-functional polyesters from the reaction of an alkenyl alcohol such as referenced above, a polyhydric alcohol such as ethylene glycol, propylene glycol, 1,6-hexanediol, diethylene glycol, neopentyl glycol, the neopentyl glycol ester of hydroxypivalic acid, and trimethylolpropane, and a polybasic acid such as phthalic anhydride, isophthalic acid, terephthalic acid, adipic acid, azelaic acid, and trimellitic acid. Component (A) is preferably a diene, diene oligomer, or polyether.

Organopolysiloxane (B) must contain at least 1 alkenyl group in each molecule, but preferably contains at least 2 alkenyl groups in each molecule. The alkenyl group in (B) can be exemplified by vinyl, allyl, butenyl, and pentenyl, with vinyl being preferred. The non-alkenyl Si-bonded groups in (B) can be exemplified by monovalent hydrocarbon groups. Representative groups which can be used include alkyl groups such as methyl, ethyl, propyl, and butyl; cycloalkyl groups such as cyclopentyl and cyclohexyl; aryl groups such as phenyl, tolyl, and xylyl; aralkyl groups such as benzyl, phenethyl, and 3-phenylpropyl; and halogenated hydrocarbyl groups such as 3-chloropropyl and 3,3,3-trifluoropropyl. The molecular structure of component (B) can be straight chain, branched chain, cyclic, network, or partially branched straight chain, but straight-chain molecular structures are preferred. The viscosity of (B) at 25° C. is preferably from 20 to 100,000 mPa·s, and particularly preferably is from 20 to 10,000 mPa·s.

Component (B) can be exemplified by trimethylsiloxy-endblocked dimethylsiloxane-methylvinylsiloxane copolymers; trimethylsiloxy-endblocked methylvinylpolysiloxanes; trimethylsiloxy-endblocked dimethylsiloxane-methylvinylsiloxane-methylphenylsiloxane copolymers; dimethylvinylsiloxy-endblocked dimethylpolysiloxanes; dimethylvinylsiloxy-endblocked methylvinylpolysiloxanes; dimethylvinylsiloxy-endblocked dimethylsiloxane-methylvinylsiloxane copolymers; dimethylvinylsiloxy-endblocked dimethylsiloxane-methylvinylsiloxane-methylphenylsiloxane copolymers; organopolysiloxane copolymers containing $R_3SiO_{1/2}$, $R_2R^1SiO_{1/2}$, and $SiO_{4/2}$ siloxane units; organopolysiloxane copolymers containing $R_2R^1SiO_{1/2}$ and $SiO_{4/2}$ siloxane units; organopolysiloxane copolymers containing $RR^1SiO_{2/2}$ siloxane units and $RSiO_{3/2}$ or $R^1SiO_{3/2}$ siloxane units; and mixtures of two or more of such organopolysiloxanes.

The R group in these units represent non-alkenyl monovalent hydrocarbyl groups among which are included alkyl groups such as methyl, ethyl, propyl, butyl, pentyl, hexyl, and heptyl; aryl groups such as phenyl, tolyl, xylyl, and naphthyl; aralkyl groups such as benzyl and phenethyl; and halogenated alkyl groups such as chloromethyl, 3-chloropropyl, and 3,3,3-trifluoropropyl. The $R^1$ group in the units represents an alkenyl group such as vinyl, allyl, butenyl, pentenyl, hexenyl, or heptenyl.

The content of (B) in the composition preferably is such as to provide a component (A):component (B) weight ratio in the range from 0.1:99.9 to 99.9:0.1, more preferably in the range from 0.5:99.5 to 50:50. A content of component (B) above the upper limit of the range causes an increasingly diminished affinity for organic oils by the crosslinked organic particles. A content below the lower limit of the range causes an increasingly diminished affinity for silicone oils by the crosslinked organic particles.

Silicon-containing organic compound (C) contains at least two silicon-bonded hydrogen atoms in each molecule. Component (C) preferably has a viscosity at 25° C. in the range from 1 to 100,000 mPa·s, and particularly preferably in the range from 1 to 10,000 mPa·s. The silicon-containing organic compound (C) can be exemplified by organohydrogenpolysiloxanes, and by organic polymers that contain diorganohydrogensilyl groups, with organohydrogenpolysiloxanes being preferred.

Organohydrogenpolysiloxanes encompassed by component (C) can have a straight-chain, branched-chain, cyclic, network, or partially branched straight-chain molecular structure, and can be exemplified by trimethylsiloxy-endblocked methylhydrogenpolysiloxanes; trimethylsiloxy-endblocked dimethylsiloxane-methylhydrogensiloxane copolymers; trimethylsiloxy-endblocked dimethylsiloxane-methylhydrogensiloxane-methylphenylsiloxane copolymers; dimethylhydrogensiloxy-endblocked dimethylpolysiloxanes; dimethylhydrogensiloxy-endblocked dimethylsiloxane-methylphenylsiloxane copolymers; dimethylhydrogensiloxy-endblocked methylphenylpolysiloxanes; organopolysiloxane copolymers containing $R_3SiO_{1/2}$, $R_2HSiO_{1/2}$, and $SiO_{4/2}$ siloxane units; organopolysiloxane copolymers containing $R_2HSiO_{1/2}$ and $SiO_{4/2}$ siloxane units; organopolysiloxane copolymers containing $RHSiO_{2/2}$ siloxane units and $RSiO_{3/2}$ or $HSiO_{3/2}$ siloxane units; and mixtures of two or more of such organopolysiloxanes. The group R in these units represents a non-alkenyl monovalent hydrocarbyl group, and it is the same as the groups referenced above.

Diorganohydrogensilyl-functional organic polymers encompassed by component (C) can be exemplified by oligomers from copolymerization of dimethylhydrogensilyl-functional acrylic monomers such as dimethylhydrogensilyl (meth)acrylate and dimethylhydrogensilylpropyl (meth)acrylate with monomers such as methyl (meth)acrylate, ethyl (meth)acrylate, butyl (meth)acrylate, ethylhexyl (meth)acrylate, lauryl (meth)acrylate, styrene, α-methylstyrene, maleic acid, vinyl acetate, and allyl acetate.

The content of component (C) in the composition provides preferably from 0.5 to 500 weight parts (C), and particularly preferably from 1 to 100 weight parts (C), in each case, for each 100 weight parts of the total amount of components (A) and (B). The possibility of an inadequate crosslinking arises when the content of component (C) in the composition falls below the lower limit of the range. A composition in which the content of component (C) exceeds the upper limit of the range risks evolution of hydrogen gas due to an excess of silicon-bonded hydrogen.

Component (D) is a catalyst for hydrosilylation reactions and one which promotes the hydrosilylation reaction in the composition, thereby inducing the crosslinking thereof. Component (D) can be exemplified by platinum catalysts, rhodium catalysts, and palladium catalysts, with platinum catalysts being preferred. Platinum catalysts can be exemplified by Pt-on-finely divided silica, Pt-on-finely divided carbon, chloroplatinic acid, alcohol solutions of chloroplatinic acid, olefin complexes of platinum, alkenylsiloxane complexes of platinum, and carbonyl complexes of platinum.

The content of component (D) in the composition is not critical, but component (D) should be added in a catalytic quantity sufficient to promote the hydrosilylation reaction in the composition. For a platinum catalyst as component (D), component (D) is preferably added in a quantity to provide from $1 \times 10^{-7}$ to $1 \times 10^{-3}$ weight parts of platinum metal for each 100 weight parts of the total amount of components (A), (B), and (C). Adequate crosslinking may not occur when the content of component (D) in the composition is below the lower limit of the range. The use of quantities in excess of the upper limit of the range is not particularly effective, and such quantities are uneconomical.

Optional components which can be added to the composition are exemplified by inhibitors for controlling the hydrosilylation reaction; reinforcing fillers such as precipitated silica, fumed silica, calcined silica, and fumed titanium oxide; semi-reinforcing fillers such as crushed quartz, diatomaceous earth, aluminosilicates, iron oxide, zinc oxide, and calcium carbonate; and any of such fillers after surface treatment with an organosilicon compound such as hexamethyldisilazane, trimethylchlorosilane, polydimethylsiloxane, or a polymethylhydrogensiloxane.

A noncrosslinking oil can also be admixed into the composition. The noncrosslinking oil can be a noncrosslinking silicone oil such as trimethylsiloxy-endblocked dimethylpolysiloxanes, trimethylsiloxy-endblocked methylphenylpolysiloxanes, trimethylsiloxy-endblocked dimethylsiloxane-methylphenylsiloxane copolymers, trimethylsiloxy-endblocked dimethylsiloxane-methyl(3,3,3-trifluoropropyl)siloxane copolymers, cyclic dimethylsiloxanes, and cyclic methylphenylsiloxanes. Noncrosslinking organic oils can also be used, representative of which are alkanes such as hexane and heptane; aromatic hydrocarbons such as benzene and toluene; chlorinated hydrocarbons such as carbon tetrachloride and methylene chloride; ketones such as methyl isobutyl ketone; alcohols such as undecyl alcohol; ethers such as dibutyl ether; esters such as isopropyl laurate and isopropyl palmitate, liquid paraffin, isoparaffin, hexyl laurate, isopropyl myristate, myristyl myristate, cetyl myristate, 2-octyldecyl myristate, isopropyl palmitate, 2-ethylhexyl palmitate, butyl stearate, decyl oleate, 2-octyldodecyl oleate, myristyl lactate, cetyl lactate, lanolin acetate, stearyl alcohol, cetostearyl alcohol, oleyl alcohol, avocado oil, almond oil, olive oil, cacao oil, jojoba oil, sesame oil, safflower oil, soy oil, camellia oil, squalane, persic oil, castor oil, mink oil, cottonseed oil, coconut oil, egg yolk oil, lard; glycol ester oils such as polypropylene glycol monooleate and neopentyl glycol 2-ethylhexanoate; polyhydric alcohol ester oils such as isostearate triglyceride and cocofatty acid triglycerides; and polyoxyalkylene ether oils such as polyoxyethylene lauryl ether and polyoxypropylene cetyl ether. The noncrosslinking oil preferably has a viscosity at 25° C. in the range from 1 to 100,000,000 mPa·s, and particularly preferably in the range from 2 to 10,000,000 mPa·s. The noncrosslinking oil is preferably present in the composition in an amount to provide from 0.1 to 5,000 weight parts of the noncrosslinking oil for each 100 weight parts of the composition excluding the noncrosslinking oil.

Suspensions according to the invention contain the crosslinked organic particles described above, an emulsifying agent, and water, with the particles being dispersed in water. The emulsifying agent functions to improve the stability of the crosslinked organic particles in water. The emulsifying agent can be a cationic surfactant, an anionic surfactant, an amphoteric surfactant, a nonionic surfactant, or a mixture of any of such surfactants.

Cationic surfactants can be exemplified by the salts of primary, secondary, and tertiary amines, alkyltrimethyl ammonium salts, dialkyldimethyl ammonium salts, tetraalkyl ammonium salts, trialkylbenzyl ammonium salts, alkylpyridinium salts, N,N-dialkylmorpholinium salts, and salts of polyethylene polyamine aliphatic amides.

Anionic surfactants can be exemplified by the salts of aliphatic acids, the salts of alkylbenzene sulfonic acids, the salts of alkylnaphthalene sulfonic acids, the salts of alkylsulfonic acids, the salts of a-olefin sulfonic acids, the salts of dialkyl sulfosuccinates, α-sulfonated aliphatic acid salts, N-acyl-N-methyltaurates, alkyl sulfate salts, sulfated oils, polyoxyethylene alkyl ether sulfate salts, polyoxyethylene alkylphenyl ether sulfates, polyoxyethylene styrenated phenyl ether sulfates, alkyl phosphates, polyoxyethylene alkyl ether phosphates, polyoxyethylene alkylphenyl ether phosphates, and formaldehyde condensates of naphthalene sulfonates.

Amphoteric surfactants can be exemplified by N,N-dimethyl-N-alkyl-N-carboxymethyl ammonium betaines, N,N-dialkylaminoalkylene carboxylates, N,N,N-trialkyl-N-sulfoalkylene ammonium betaines, N,N-dialkyl-N,N-bispolyoxyethylene ammonium sulfate ester betaines, and 2-alkyl-1-carboxymethyl-1-hydroxyethyl imidazolinium betaines.

Nonionic surfactants can be exemplified by polyoxyethylene alkyl ethers, polyoxyethylene alkenyl ethers, polyoxyethylene alkylphenyl ethers, polyoxyethylene polystyrylphenyl ethers, polyoxyethylene-polyoxypropylene glycols, and polyoxyethylene-polyoxypropylene alkyl ethers; aliphatic acid partial esters of polyhydric alcohols such as aliphatic acid esters of sorbitan, aliphatic acid esters of glycerol, aliphatic acid esters of decaglycerol, aliphatic acid esters of polyglycerol, aliphatic acid esters of ethylene glycol/pentaerythritol, and aliphatic acid esters of propylene glycol/pentaerythritol; polyoxyethylene adducts of aliphatic acid partial esters of polyhydric alcohols such as polyoxyethylene adducts of aliphatic acid esters of sorbitan and polyoxyethylene adducts of aliphatic acid esters of glycerol; polyoxyethylene/aliphatic acid esters; aliphatic acid esters of polyglycerol; polyoxyethylated castor oil; diethanolamides of aliphatic acids; polyoxyethylene alkylamines; aliphatic acid partial esters of triethanolamine; trialkylamine oxides; and polyoxyalkylene-functional organopolysiloxanes. Nonionic surfactants are preferred, however.

The content of the emulsifying agent is preferably from 0.1 to 20 weight parts, and particularly preferably from 0.5 to 10 weight parts, in each case, for each 100 weight parts of the crosslinked organic particles. While the amount of water is not critical, it should preferably constitute from 5 to 99 weight % of the suspension, more preferably from 10 to 80 weight %.

The suspensions may contain other ingredients representative of which are additives for stabilizing the dispersion or adjusting the viscosity including ethanol and water-soluble polymers such as xanthan gum, guar gum, carboxymethylcellulose, polyvinyl alcohol, polyvinylpyrrolidone, carboxyvinyl polymers, hydroxyethylcellulose, and polyoxyethylene glycol distearate; film-forming agents such as polymers of radically polymerizable (meth)acrylic monomers, copolymers of silicone compounds with radically polymerizable (meth)acrylic monomers, poly(N-acylalkylene imine)s, poly(N-methylpyrrolidone)s, and silicone resins containing fluorinated organic groups, amino groups, or silanol groups; oxidation inhibitors such as BHA, BHT, and γ-orizanol; antifreezes such as ethanol, isopropyl alcohol, 1,3-butylene glycol, ethylene glycol, propylene glycol, and glycerol; antimicrobials and preservatives such as triclosan and triclocarban; pearlescent agents; chelating agents such as ethylenediamine tetraacetic acid, citric acid, ethane-1-hydroxy-1,1-diphosphonic acid, and their salts; UV absorbers including benzophenone derivatives such as 2-hydroxy-4-methoxybenzophenone, benzotriazole derivatives such as 2-(2'-hydroxy-5'-methylphenyl) benzotriazole, and cinnamic acid esters; colorants such as chromatogens, dyes, and pigments; spray-enabling agents; vitamins; hair tonics; growth promoters; hormones; fragrances; and perfumes.

Crosslinked organic particles and suspensions containing the particles are useful as components for imparting properties such as lubricity, softness, and flexibility to lubricants, cleaning agents, flatting agents, cosmetics, and materials employed in electrostatic development such as toners and carriers; as components for imparting properties such as flatness, softness, and flexibility to paints and coatings; and as components for imparting properties such as lubricity and impact resistance to thermosetting resins and thermoplastic resins.

One method for preparing the suspension is by emulsifying a fluid composition containing components (A), (B), (C), and (D), in water using an emulsifying agent, and then crosslinking the composition by effecting hydrosilylation.

Another method for preparing the suspension is by emulsifying a fluid composition containing components (A), (B), and (C), in water using an emulsifying agent, adding component (D), and subsequently crosslinking the composition by effecting hydrosilylation.

Components (A), (B), (C), and (D) used in these methods are the same as the components described above. The emulsifying device used during the emulsifying agent-supported emulsification of the component (A)–(D) composition in water, during the emulsifying agent-supported emulsification of the component (A)–(C) composition in water, and during the addition of component (D) to the component (A)–(C) composition, can be exemplified by homomixers, paddle mixers, Henschel mixers, homodispersers, colloid mills, propeller-type stirrers, homogenizers, inline continuous emulsifiers, ultrasound emulsifiers, and vacuum mills.

Surfactants of the type described above can be used as the emulsifying agent in these methods, and the use of a nonionic surfactant is particularly preferred. The emulsifying agent is preferably added at from 0.1 to 20 weight parts, and particularly preferably at from 0.5 to 10 weight parts, in each case, for each 100 weight parts of the total amount of components (A) to (D). The amount of water addition is not critical, but it preferably constitutes from 5 to 99 weight % of the overall emulsion, and more preferably 10 to 80 weight %.

The suspension of the crosslinked organic particles can be produced by heating the emulsion of the fluid composition, or by holding the emulsion at room temperature to effect hydrosilylation-induced crosslinking of the water-dispersed fluid composition.

Crosslinked organic particles for use herein should have an average particle size in the range from 0.1 to 500 μm, and preferably have an average particle size in the range from 0.1 to 200 μm. It is quite difficult to prepare crosslinked organic particles with an average particle size below the lower limit of the range. Crosslinked organic particles with an average particle size exceeding the upper limit of the range exhibit an increasingly impaired dispersibility when blended into organic resins, paints, coatings, and cosmetics.

The shape of the crosslinked organic particles can be spherical, spindle-shaped, plate-like, disk-like, or irregular, with a spherical shape being preferred. They can be in the form of an elastomer such as a soft gel or rubber, or they can be in the form of a hard resin. Elastomers such as gels and rubbers are preferred, and rubbers are particularly preferred.

The technique used in the methods to remove water from the suspension containing the particles is exemplified by spraying the suspension into a hot gas current, freeze-drying the suspension, or addition of salt to the suspension to aggregate the crosslinked organic particles, followed by thermal drying of the separated slurry of the crosslinked organic particles. It is preferred that the crosslinked organic particles be used in the form of a suspension, since suspensions offers particularly good handling characteristics, and are blendable with other components.

EXAMPLES

Crosslinked organic particles, suspensions containing the particles, and methods for preparing the particles and the suspensions are explained in greater detail in the following working examples. The viscosity values used in these examples were measured at 25° C. Procedures for determining various properties of the crosslinked organic particles are explained in detail below.

Durometer of the Crosslinked Organic Particles

The fluid composition used to produce the crosslinked organic particles was heated for 30 minutes in a forced circulation oven at 130° C. to produce a crosslinked organic sheet. The durometer of the sheet was measured using a type A durometer as described in Japanese Industrial Standard (JIS) K 6253-1997. The resulting value was used as the durometer value for the crosslinked organic particles.

Average Particle Size of the Crosslinked Organic Particles

Measurement was carried out on a crosslinked organic particle suspension using a laser diffraction instrument for measuring particle size distributions, Model LA-500 of Horiba Seisakusho. The median diameter, which is a particle diameter corresponding to 50% of the cumulative distribution, is afforded by this measurement, and it is used as the average particle size of the crosslinked organic particles.

Affinities for Organic Oil and Silicone Oil Exhibited by the Crosslinked Organic Sheet and Crosslinked Organic Particles The fluid composition used to produce the crosslinked organic particles was heated for 30 minutes in a forced circulation oven at 130° C. to produce a crosslinked organic sheet. The sheet was cut into specimens with dimensions of 2 cm×2 cm×1 cm. Specimens were immersed for 24 hours in an organic oil or silicone oil, after which period the weight increase was determined. The weight of the contained oil, expressed as a percentage calculated on the crosslinked organic sheet, was used as the oil absorption weight % of the crosslinked organic sheet.

For the crosslinked organic particles themselves, a five gram portion was introduced into a 100 mL beaker. Then while slowly stirring the crosslinked organic particles with a glass rod, an organic oil or silicone oil was added one drop at a time, and the quantity of oil required to just produce a homogeneous paste of oil and crosslinked organic particles was determined. The weight of the added oil, expressed as a percentage of the crosslinked organic particles, was used as the oil absorption weight % of the crosslinked organic particles.

Example 1

A fluid composition was prepared by mixing to homogeneity at 5° C., 8.26 weight parts of an allyl-terminated polypropylene oxide with a viscosity of 390 mPa·s and an average molecular weight of 3,000; 8.26 weight parts of a dimethylvinylsiloxy-endblocked dimethylpolysiloxane with a viscosity of 100 mPa·s; 9.14 weight parts of an organopolysiloxane with the formula

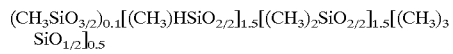

having a viscosity of 20 mPa·s and containing at least 3 silicon-bonded hydrogens in each molecule; and sufficient of an isopropanolic chloroplatinic acid solution to provide 50 weight-ppm of platinum metal in the composition.

An emulsion of the composition was subsequently prepared by rapidly mixing the composition into 100 weight parts of a 2.5 weight % aqueous polyoxyethylene (9 mol adduct) nonylphenyl ether solution which had been adjusted to 25° C., emulsifying it with a colloid mill, and then introducing the product into 200 weight parts of pure water. A suspension of crosslinked organic particles was produced by carrying out hydrosilylation in the water-emulsified composition by holding the emulsion for 24 hours at 35° C. The suspension was dried by spraying into a hot gas current at 200° C. and yielded spherical crosslinked organic particles composed of a rubbery material. The properties of the crosslinked organic particles are shown in Table 1.

Comparative Example 1

A fluid composition was prepared by mixing to homogeneity at 5° C., 16.52 weight parts of a dimethylvinylsiloxy-endblocked dimethylpolysiloxane with a viscosity of 100 mPa·s; 9.14 weight parts of a organopolysiloxane with the formula

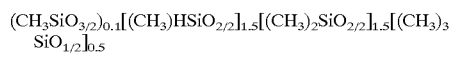

having a viscosity of 20 mPa·s and containing at least 3 silicon-bonded hydrogens in each molecule; and sufficient of an isopropanolic chloroplatinic acid solution to provide 50 weight-ppm of platinum metal in the composition. A suspension of silicone rubber particles was prepared by effecting crosslinking in the composition as described in Example 1. Spherical silicone rubber particles were obtained by removing water from the suspension as described in Example 1. The properties of the silicone rubber particles are shown in Table 1.

Example 2

A fluid composition was prepared by mixing 5.4 weight parts of 1,5-hexadiene having a molecular weight of 82.15; 44.7 weight parts of a dimethylvinylsiloxy-endblocked dimethylpolysiloxane with a viscosity of 400 mPa·s; and 50 weight parts of a trimethylsiloxy-endblocked dimethylsiloxane-methylhydrogensiloxane copolymer with a viscosity of 50 mPa·s containing at least 3 silicon-bonded hydrogens in each molecule. An emulsion of the composition was subsequently prepared by rapidly mixing the composition into 100 weight parts of a 1.65 weight % aqueous polyoxyethylene (9 mol adduct) nonylphenyl ether solution which had been adjusted to 25° C., emulsifying it with a colloid mill, and then introducing the product into 200 weight parts of pure water.

Into the emulsion was then admixed a separately prepared water-based emulsion of a platinum catalyst. The platinum catalyst contained 1,1-divinyl-1,1,3,3-tetramethyldisiloxane as the solvent and a Pt/1,1-divinyl-1,1,3,3- tetramethyldisiloxane complex as the catalytic component. The average particle size of the platinum catalyst in the catalyst emulsion was 0.05 µm, and the platinum metal concentration in the catalyst emulsion was 0.05 weight %. The catalyst emulsion was added in sufficient quantity to provide 20 weight-ppm of platinum metal based on the total amount of 1,5-hexadiene and dimethylvinylsiloxy-endblocked dimethylpolysiloxane in the first-described emulsion. A suspension of crosslinked organic particles was then produced by carrying out an hydrosilylation-mediated crosslinking in the water-emulsified composition by holding the emulsion for 24 hours at 35° C. The suspension was dried by spraying into a hot gas current at 200° C. and yielded spherical crosslinked organic particles composed of a rubbery material. The properties of the crosslinked organic particles are shown in Table 1.

Comparative Example 2

A fluid composition was prepared by mixing 94.0 weight parts of a dimethylvinylsiloxy-endblocked dimethylpolysiloxane having a viscosity of 400 mPa·s, and 6.0 weight parts of a trimethylsiloxy-endblocked dimethylsiloxane-methylhydrogensiloxane copolymer with a viscosity of 50 mPa·s containing at least 3 silicon-bonded hydrogens in each molecule. An emulsion of the composition was subsequently prepared by rapidly mixing the composition into 100 weight parts of a 1.65 weight % aqueous polyoxyethylene (9 mol adduct) nonylphenyl ether solution, emulsifying it with a colloid mill, and then introducing the product into 200 weight parts of pure water.

Into the emulsion was then admixed a separately prepared water-based emulsion of a platinum catalyst. The platinum catalyst contained 1,1-divinyl-1,1,3,3-tetramethyldisiloxane as the solvent and a Pt/1,1-divinyl-1,1,3,3-tetramethyldisiloxane complex as the catalytic component. The average particle size of the platinum catalyst in the catalyst emulsion was 0.05 µm, and the platinum metal concentration in the catalyst emulsion was 0.05 weight %. The catalyst emulsion was added in sufficient quantity to provide 20 weight-ppm of platinum metal based on the total amount of the dimethylvinylsiloxy-endblocked dimethylpolysiloxane in the first-described emulsion. A suspension of silicone rubber particles was then produced by carrying out an hydrosilylation-mediated crosslinking in the water-emulsified composition by holding the overall emulsion for 24 hours at 35° C. The suspension was dried by spraying into a hot gas current at 200° C. and yielded spherical silicone rubber particles. The properties of the silicone rubber particles are shown in Table 1.

Comparative Example 3

A fluid composition (I) was prepared by mixing to homogeneity, 50 weight parts of a dimethylvinylsiloxy-endblocked dimethylpolysiloxane with a viscosity of 1,000 mPa·s, and 11 weight parts of a dimethylhydrogensiloxy-endblocked dimethylsiloxane-methylhydrogensiloxane copolymer with a viscosity of 20 mPa·s.

A fluid composition (II) was also prepared by mixing to homogeneity, 50 weight parts of a dimethylvinylsiloxy-endblocked dimethylpolysiloxane with a viscosity of 1,000 mPa·s; 10 weight parts of 1-octene; and sufficient of an isopropanolic chloroplatinic acid solution to provide 20 weight-ppm of platinum metal based on the amount of dimethylpolysiloxane.

61 weight parts of composition (I) and 60 weight parts of composition (II) were mixed with each other to homogeneity at 5° C. The resulting mixture was rapidly mixed into 4 weight parts of polyoxyethylene nonylphenyl ether having an HLB of 13.1, and 200 weight parts of pure water at 25° C. A uniform emulsion was produced using an homogenizer operating at 300 kgf/cm². A suspension of silicone rubber particles was produced by holding the emulsion for 6 hours at 30° C. to carry out an hydrosilylation-mediated crosslinking in the water-emulsified composition. The resulting suspension was dried by spraying it into a hot gas current at 200° C. yielding spherical silicone rubber particles. The properties of the silicone rubber particles are shown in Table 1.

TABLE 1

|  | Ex. 1 | Ex. 2 | Comp. Ex. 1 | Comp. Ex. 2 | Comp. Ex. 3 |
| --- | --- | --- | --- | --- | --- |
| durometer | 65 | 42 | 46 | 31 | 25 |
| average particle size, µm | 3 | 4 | 3 | 4 | 5 |
| oil absorption (wt %) of the crosslinked sheet | | | | | |
| organic oil | 35 | 21 | 14 | 16 | 25 |
| silicone oil | 60 | 80 | 170 | 230 | 180 |
| oil absorption (wt %) of the crosslinked particles | | | | | |
| organic oil | 180 | 50 | 40 | 50 | 30 |
| silicone oil | 100 | 190 | 320 | 360 | 300 |

Application as a Cosmetic Component

Five liquid cosmetics were produced by stirring the following ingredients for 5 minutes at 2,500 rpm with a homodisperser, 74 weight parts of the suspension prepared in Example 1, Example 2 or Comparative Examples 1, 2, or 3; 5 weight parts of octyl p-methoxycinnamate; 1 weight part of α-monoisostearylglyceryl ether polyoxyethylene sorbitan monooleate; 2 weight parts of beeswax; 2 weight parts of lanolin; 10 weight parts of squalane; 5 weight parts of liquid paraffin; a preservative in an appropriate amount; and a fragrance in an appropriate amount. These cosmetics were evaluated as described below. The results of the evaluations are shown in Table 2.

Dispersibility of the Crosslinked Microparticles

The cosmetic was coated in a thin layer on a glass plate, and the particle size of the crosslinked organic particles or silicone rubber particles dispersed in the cosmetic was measured using a microscope. This value was used as the dispersibility of the crosslinked particles.

Spreadability on the Skin

The cosmetic was used by the members of a 10-person panel. A report of a good sensation by 8 to 10 panelists was scored as +. A report of a good sensation by 4 to 7 panelists was scored as Δ. A report of a good sensation by 0–3 panelists was scored as x.

Skin Smoothness

The cosmetic was used by members of a 10-person panel. A report of a good sensation by 8 to 10panelists was scored as +. A report of a good sensation by 4 to 7 panelists was scored as Δ. A report of a good sensation by 0–3 panelists was scored as x.

TABLE 2

| source of the crosslinked particles | Example 1 | Example 2 | Comp. Ex. 1 | Comp. Ex. 2 | Comp. Ex. 3 |
|---|---|---|---|---|---|
| dispersibility, μm | approx. 5 | approx. 5 | 1–10 | 10–15 | approx. 5–10 |
| spread ability on the skin | + | + | + | Δ, stiff | + |
| skin smoothness | + | + | Δ, some roughness | x, stiff | Δ, somewhat soft |

Crosslinked organic particles according to the invention have a very good affinity for organic oils such as mineral oils and synthetic oils, and a suitable affinity for silicone oils. Methods according to the invention for preparing crosslinked organic particles are highly efficient. Suspensions containing the crosslinked organic particles have excellent handling characteristics and excellent blendability with other components. Methods for preparing the suspensions are also highly efficient.

Other variations may be made in compounds, compositions, and methods described herein without departing from the essential features of the invention. The embodiments of the invention specifically illustrated herein are exemplary only and not intended as limitations on their scope except as defined in the appended claims.

What is claimed is:

1. A composition of matter comprising crosslinked organic particles having an average particle size of 0.1 to 500 μm prepared by emulsifying in water using an emulsifying agent, a fluid composition comprising (A) an organic compound having at least two aliphatically unsaturated bonds in each molecule, (B) an organopolysiloxane having at least one alkenyl group in each molecule, (C) a silicon-containing organic compound having at least two silicon-bonded hydrogen atoms in each molecule, and (D) a hydrosilylation reaction catalyst; crosslinking the fluid composition by carrying out an hydrosilylation reaction; and thereafter removing water; component (A) being a diene, diene oligomer, or polyether.

2. The composition according to claim 1 in which the component (A):component (B) weight ratio is 0.1:99.9 to 99.9:0.1, component (C) is present at 0.5 to 500 weight parts for each 100 weight parts of the total amount of components (A) and (B), and component (D) is present in a catalytic amount.

3. A method of preparing crosslinked organic particles having an average particle size of 0.1 to 500 μm by emulsifying in water using an emulsifying agent, a fluid composition comprising (A) an organic compound having at least two aliphatically unsaturated bonds in each molecule, (B) an organopolysiloxane having at least one alkenyl group in each molecule, and (C) a silicon-containing organic compound that has at least two silicon-bonded hydrogen atoms in each molecule; adding (D) a hydrosilylation reaction catalyst; crosslinking the fluid composition by carrying out an hydrosilylation reaction; and thereafter removing water; component (A) being a diene, diene oligomer, or polyether.

4. A method according to claim 3 in which the component (A):component (B) weight ratio is 0.1:99.9 to 99.9:0.1, component (C) is present at 0.5 to 500 weight parts for each 100 weight parts of the total of components (A) and (B), and component (D) is used in a catalytic amount.

5. A method of preparing a suspension of crosslinked organic particles whose average particle size is from 0.1 to 500 μm, by emulsifying in water using an emulsifying agent, a fluid composition comprising (A) an organic compound having at least two aliphatically unsaturated bonds in each molecule, (B) an organopolysiloxane having at least one alkenyl group in each molecule, and (C) a silicon-containing organic compound having at least two silicon-bonded hydrogen atoms in each molecule; adding (D) an hydrosilylation reaction catalyst; and crosslinking the fluid composition by carrying out an hydrosilylation reaction; component (A) being a diene, diene oligomer, or polyether.

6. A method according to claim 5 in which the component (A):component (B) weight ratio is 0.1:99.9 to 99.9:0.1, component (C) is present at 0.5 to 500 weight parts for each 100 weight parts of the total amount of components (A) and (B), and component (D) is used in a catalytic amount.

* * * * *